United States Patent [19]
Willis et al.

[11] Patent Number: 4,524,447
[45] Date of Patent: Jun. 18, 1985

[54] DIGITAL SIGNAL PROCESSING APPARATUS HAVING DIGITAL DITHER

[75] Inventors: Donald H. Willis, Indianapolis; Jack S. Fuhrer, Carmel, both of Ind.

[73] Assignee: RCA Corporation, Princeton, N.J.

[21] Appl. No.: 498,151

[22] Filed: May 25, 1983

[51] Int. Cl.³ .......................... H04N 9/50; H04N 9/32
[52] U.S. Cl. ........................................ 375/26; 358/23; 328/162
[58] Field of Search ............. 358/13, 36, 141, 23; 375/26; 332/11 R, 9 R; 340/347 AD, 347 M; 381/31; 370/102, 118; 328/162, 166

[56] References Cited

U.S. PATENT DOCUMENTS

| | | | |
|---|---|---|---|
| 2,669,608 | 2/1954 | Goodall | 375/26 |
| 4,183,016 | 1/1980 | Sawagata | 340/347 AD |
| 4,234,850 | 11/1980 | Collins | 328/74 |
| 4,275,411 | 6/1981 | Lippel | 358/13 |
| 4,323,916 | 4/1982 | Dischert et al. | 358/13 |
| 4,334,237 | 6/1982 | Reitmeier et al. | 358/36 |
| 4,352,123 | 9/1982 | Flamm | 358/23 |

OTHER PUBLICATIONS

A. Goldberg, "PCM Encoded NTSC Color Television Subjective Tests", *Journal of the SMPTE*, vol. 82, Aug. 1973, pp. 649–654.
V. Devereux, "Application of PCM To Broadcast Quality Video Signals", *The Radio and Electronic Engineer*, vol. 44, No. 7, Jul. 1974, pp. 373–381.
ITT Semiconductors, VLSI Digital TV System DIGIT 2000, Aug. 1982.

*Primary Examiner*—Benedict V. Safourek
*Attorney, Agent, or Firm*—E. M. Whitacre; P. J. Rasmussen; C. A. Berard, Jr.

[57] ABSTRACT

The present invention provides for the generation of digitally dithered digital signals which can have an apparent quantizing resolution unaffected by truncation of the least significant bit. The truncated digital signal is dithered in an ordered fashion by adding thereto a bit developed in response to one condition of the truncated bit and is not dithered in response to another condition thereof. The original digital signal can be reconstructed by combining successive samples of the truncated digital signals. One feature of the present invention provides a truncation of digital signals.

22 Claims, 7 Drawing Figures

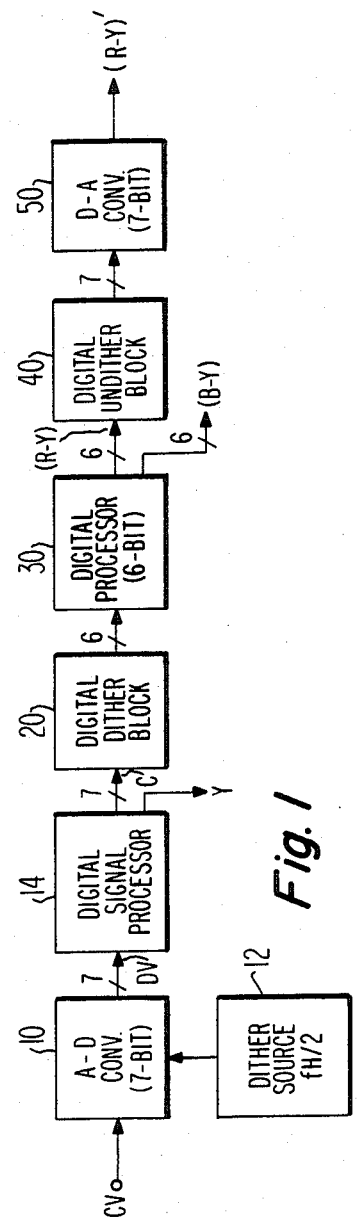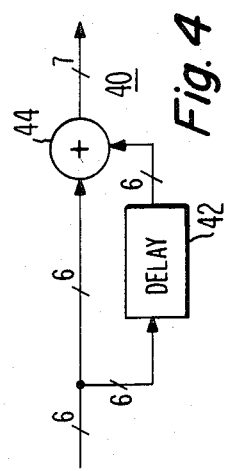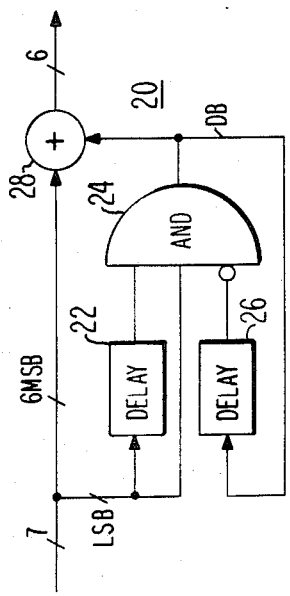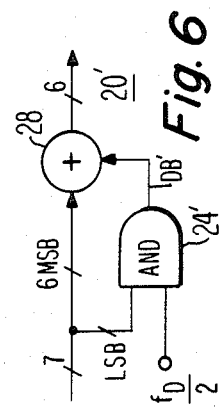

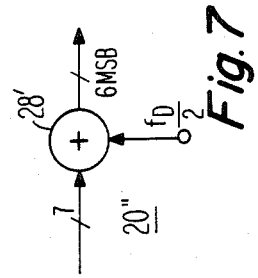
Fig. 7
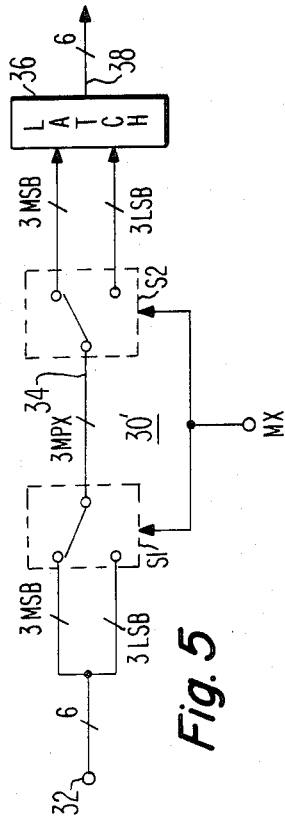
Fig. 3
Fig. 5

DIGITAL SIGNAL PROCESSING APPARATUS HAVING DIGITAL DITHER

The present invention relates to digital signal processing apparatus in which the digital signal level is modified in accordance with a low-level digital signal. The present invention is useful in processing digital television signals in a television receiver.

In a system employing an analog-to-digital converter (ADC) to develop digital signals representing analog signals, it is known to introduce a low-level analog disturbance into the analog signals so as to increase the apparent quantizing resolution of the ADC beyond that inherent in the number of possible levels of the digital signals it develops. The low-level signals are commonly referred to as dither signals and the technique is referred to as dithering. U.S. Pat. Nos. 4,352,123 and 4,334,237 describe examples of such analog dithering arrangements in which the dithering signals are coherent so that the dithering is ordered, i.e. the digital signals can be processed so as to preserve the apparent improvement in quantizing resolution. Other arrangements introduce low-level random noise signals to produce dithering, but this merely tends to mask the effects of limited quantizing resolution rather than enabling preservation of the apparent improvement in quantizing resolution.

Digital signal processing apparatus processing the above-described dithered digital signals can cause loss of the additional information provided by the ordered dither. This can be caused by filtering, truncating or rounding operations, or where the number of bits processed is simply too small. Thus, there is a need for an arrangement which preserves the information provided by the ordered dithered digital signals even when the signal processing apparatus processes too few bits of the digital signals. In addition, there is a need for apparatus retaining the information represented by undithered digital signals when too few bits thereof are digitally processed.

Accordingly, the present invention comprises a dithering device for developing bit signals responsive to the least significant bit of digital signals and combining the bit signals and the digital signals to produce dithered digital signals. In addition, successive samples of dithered digital signals processed by a processing device are combined to develop digital ouput signals.

In the drawing:

FIG. 1 is a schematic diagram in block diagram form of apparatus including an exemplary embodiment of the present invention;

FIGS. 2, 4, 5, 6 and 7 are schematic diagrams partially in block diagram form, of exemplary and alternative embodiments of portions of the apparatus of FIG. 1; and FIG. 3 is a table of exemplary digital signal values illustrating the operation of the apparatus of FIG. 1.

In the drawing, line arrows represent signal paths for analog signals or for single bit digital signals and line arrows having slash marks represent signal paths for multiple-bit parallel digital signals having a number of bits indicated by the numeral or legend proximate the slash mark.

FIG. 1 shows a digital signal processing arrangement as is employed in a color television receiver, and in which the present invention provides advantage. Analog composite video signals CV are applied to seven-bit analog-to-digital converter (ADC) 10 which develops seven-bit digital signals having levels representing the magnitudes of samples of analog signals CV. ADC 10 receives a sampling signal (not shown), preferably at four times the frequency $f_{sc}$ of the color subcarrier signal and in phase lock with the reference burst thereof, to produce digital video signals DV at a $4f_{sc}$ rate. ADC 10 also receives a signal from dither source 12 at one-half the horizontal line rate $f_H$ to create an analog dither having an amplitude approximately equivalent to one-half the value represented by the least significant bit (LSB) of digital video signals DV. Dither source 12, while tending to increase the apparent quantizing resolution of ADC 10, is not necessary to the present invention.

Seven-bit digital video signals DV are applied to digital signal processor 14 which, for example, separates the digital luminance Y and digital chrominance C component signals. Processor 14 comprises, for example, a digital 1H comb filter or digital band-pass and low-pass filters for separating digital luminance Y and chrominance C component signals, a chrominance bandpass filter, and an automatic chrominance control to standardize the magnitude of the chrominance subcarrier signals. This processing can produce many additional bits (e.g. 13-bit signals) but the output from processor 14 is limited to seven-bits.

Because digital chrominance processor 30 is arranged to process, at least in part, only six-bit digital signals, digital dither block 20 is interposed to couple processor 14 to processor 30. Digital dither block 20 is responsive to the conditions of the bits of digital chrominance component signals C to selectively add dither or not add dither to its output digital signal.

FIG. 2 shows an exemplary embodiment of digital dither block 20 receiving seven-bit signals from processor 14 and supplying six-bit selectively dithered digital signals to processor 30. The operation of dither block 20 is similar to a truncation operation of seven-bit signals into six-bit signals. The six most significant bits (MSB) of the input seven-bit signals are applied to digital adder 28. The LSB thereof is applied to an input of AND gate 24 and to delay device 22. Delay device 22 is, for example, a digital one-bit latch or a one-stage one-bit shift register which delays the LSB until the next occurring sample of the LSB is present.

If the LSB is in a logical zero condition, AND gate 24 produces a zero output signal bit DB which, when added to the six MSB by adder 28, causes the dithered six-bit output signal to correspond to the six MSBs of the present input signal sample. This is illustrated by the examples given in the first two lines of the table of FIG. 3 which shows, for simplicity of explanation, only four-bit digital signals. Because the sequence of four input signal sample values on each line have zero LSBs, the sequence of AND gate signal bits DB are also zeros, and the dithered signals are a sequence of exactly the three MSBs of the input signal samples.

If the LSB is in a logical one condition twice in succession, however, AND gate 24 detects coincidence of logical one conditions of the delayed and undelayed LSB samples to produce a logical one signal bit DB which is added to the six MSBs of the present input signal sample by adder 28. Signal bit DB is delayed by delay device 26, which is the same structure as delay device 22. On the next sample of the input signals, the inversion (indicated by the circle at the input of AND gate 24) of the delayed signal bit DB prevents coincidence being detected by AND gate 24 causing signal bit DB to again be zero. Thus, if the LSB of the input signals is in the condition of being a logical one, signal bit DB alternates between one and zero on successive samples, so that adder 28 alternately adds and does not add one to the six MSBs of successive samples of the digital input signals. This is illustrated by the examples given in the last two lines of the table of FIG. 3 which shows a sequence of alternating values for signal bit DB and for the dithered signals.

Six-bit dithered signals developed by block 20 are applied to and processed by digital processor 30 which is, for example, a TV digital chrominance processor. Processor 30 performs operations such as adjusting saturation (color intensity) and hue (tint), demodulating the (R−Y) and (B−Y) chrominance component signals, and filtering the (R−Y) and (B−Y) signals. In addition, processor 30 can include operations described above in relation to processor 14, e.g. bandpass filtering the chrominance signals, and automatic chrominance controlling to standardize the magnitude of the chrominance subcarrier signals.

Six-bit (R−Y) chrominance digital signals developed by processor 30 are applied to digital undither block 40 which reforms seven-bit (R−Y) digital signals by combining successive ones of the six-bit samples of the processed (R−Y) signals. A satisfactory arrangement for undither block 40 is the averaging circuit shown in FIG. 4. Six-bit incoming digital signals are applied to six-bit digital adder 44 and to delay device 42 which is a six-bit parallel latch or a six-bit parallel one-stage shift register. Adder 44 sums delayed incoming signals and undelayed incoming signals, both being six-bit signals, to develop a seven-bit reformed digital signal. The right-most column in the table of FIG. 3 illustrates that the sequences of reformed undithered signal values provided by block 40, i.e. formed by adding successive samples of the dithered signals, are exact replicas of the sequences of input signal values given in the left-most column thereof. This example assumes, for purposes of illustration, that the values of the dithered signals prior to processing are the same as those of the processed dithered signals, which condition may not occur in practice.

The seven-bit reformed (R−Y) digital signals produced by block 40 are converted into analog color signals (R−Y)′ by seven-bit digital-to-analog converter 50. The processed (B−Y) signals developed by processor 30 are undithered by a second digital undither block (not shown) which is similar to block 40 and converted to analog (B−Y) signals by a second DAC (not shown) which is similar to DAC 50.

One arrangement of digital processor 30 which happens to produce processed dithered digital signals having the same values as the unprocessed dithered digital signals is the arrangement 30′ shown in FIG. 5. Multiplexing control signals MX have a frequency of twice the data rate of the dithered digital signals received at terminal 32. Multiplexing controllable switch S1 responds to control signals MX to alternately apply the 3 MSB and the 3 LSB to be transmitted along signal path 34 as time multiplexed bits 3 MPX. Demultiplexing controllable switch S2 is correspondingly responsive to control signals MX to alternately apply the multiplexed bits 3 MPX to separate lines for the 3 MSB and 3 LSB. Digital latch 36 stores the 3 MSB and 3 LSB to reform the original six-bit dithered digital signal at output signal path 38.

FIG. 6 shows digital dither block 20′ which is an alternative embodiment of dither block 20. When the LSB of the seven-bit digital input signals is zero valued, AND gate 24′ is disabled and digital adder 28 produces the six bits of the input digital signals as dithered digital signals. When the LSB thereof is a logical one, AND gate 24′ is enabled to detect coincidence of that LSB and clocking signal $f_D/2$ which has a frequency of one-half the rate at which the input digital signals are received. Bit signals DB′ are therefore alternately at zero and one conditions for alternate samples of the input digital signals and are added thereto by adder 28 to develop six-bit dithered digital signals. Block 20′ therefore performs truncation of seven-bit signals to six-bit signals.

Modifications are contemplated to the present invention within the scope of the claims following. For example, digital dither blocks 20 or 20′ can be replaced by alternate dither block 20″ shown in FIG. 7. Therein, the function of AND gates 24 or 24′ is performed by seven-bit digital adder 28′. Alternating signals $f_D/2$, having the bit weight of the LSB of the input digital signals, are added to the input digital signals under all conditions by adder 28′ from which only the six MSB are provided as output dithered digital signals. If the LSB is in a zero condition, the six MSB are unaffected by the addition of the $f_D/2$ signals. If the LSB is in a one condition, the dithered digital signals alternate in value in correspondence with the $f_D/2$ signal. Thus, dither block 20″ produces the same dithering operation as that described previously.

By way of further example, digital dither blocks 20, 20′ and 20″ described herein can be employed for emulating the truncation of N-bit digital signals into (N−1)-bit digital signals. The advantage of the present invention when so employed is that the information carried by the truncated bit need not be lost where reformation of the original signals is provided as described herein.

The apparatus described herein including ADC 10, source 12, processors 14 and 30, and DAC 50 correspond, for example, to digital signal processing integrated circuits for television receivers available from ITT Semiconductors, Intermetall, Freiburg, West Germany and described in an ITT Semiconductors brochure entitled *VLSI Digital TV System DIGIT* 2000, dated August 1982, which is incorporated herein by reference. The numbers of bits of the digital signals described herein correspond to those integrated circuits. In addition, U.S. Pat. No. 4,352,123 describing a dithered ADC and digital luminance and chrominance processing is also incorporated herein by reference.

As described above, the present invention tends to retain the information represented by one deleted bit so that exact reconstruction of the original digital signals is possible. The present invention can be similarly employed where more than one LSB is deleted. For example, where two bits are deleted, the ordered digital dithering sequence applied to the retained MSBs includes four successive samples dithered to represent the deleted bit values as ordered quarter values. In this case, sequence of four successive samples are averaged to reform the original data signals.

What is claimed is:

1. Digital signal processing apparatus comprising:
  a source of digital signals having N bits, where N is a positive integer;
  dithering means, coupled to said source, for developing dithered digital signals having less than N bits, including first means responsive to the least significant bit of said digital signals for producing said dithered digital signals having successive conditions for successive samples of said digital signals;

processing means, coupled to said dithering means, for digitally processing said dithered digital signals having less than N bits received at an input thereof to develop processed digital signals at an output thereof; and combining means, coupled to said processing means, for combining successive samples of said processed digital signals to produce digital output signals.

2. The apparatus of claim 1 wherein said first means comprises a source of dither signals having alternating conditions for alternate samples of said digital signals, and an AND gate having a first input coupled for receiving said dither signals, having a second input coupled for receiving the least significant bit of said digital signals and having an output at which said bit signals are developed.

3. The apparatus of claim 1 wherein said combining means comprises delaying means for delaying said processed digital signals, and second combining means for combining said processed digital signals and said delayed processed digital signals to produce said digital ouput signals.

4. The apparatus of claim 3 wherein said second combining means includes a digital adder for adding said processed digital signals and said delayed processed digital signals to produce said digital output signals.

5. Digital signal processing apparatus comprising:
a source of digital signals having N bits, where N is a positive integer;

dithering means, coupled to said source, for developing dithered digital signals having less than N bits including first means responsive to one condition of the least significant bit of said digital signals for producing bit signals having successive conditions for successive samples of said digital signals, and second means for combining said bit signals and the bits of said digital signal other than the least significant bit thereof to develop said dithered digital signals;

processing means, coupled to said dithering means, for digitally processing said dithered digital signals having less than N bits received at an input thereof to develop processed digital signals at an output thereof; and combining means, coupled to said processing means, for combining successive samples of said processed digital signals to produce digital output signals.

6. The apparatus of claim 5 wherein said first means comprises delaying means for delaying the least significant bit of said digital signals, and detecting means for producing said bit signals in response to coincidence and non-coincidence of said least significant bit and said delayed least significant bit.

7. The apparatus of claim 6 wherein said detecting means includes an AND gate having first and second inputs for receiving said least significant bit and said delayed least significant bit, respectively.

8. The apparatus of claim 6 wherein said first means further comprises delaying means for delaying said bit signals, and said detecting means produces said bit signals in response to coincidence and non-coincidence of said least significant bit, said delayed least significant bit and said delayed bit signals.

9. The apparatus of claim 8 wherein said detecting means includes an AND gate having first, second and third inputs for responding to said least significant bit, said delayed least significant bit, and said delayed bit signals, respectively.

10. The apparatus of claim 8 wherein said second means includes a digital adder for adding said bit signals and the bits of said digital signals other than the least significant bit thereof.

11. The apparatus of claim 5 wherein said second means includes a digital adder for adding said bit signals and the bits of said digital signals other than the least significant bit thereof.

12. The apparatus of claim 5 wherein said first means comprises a source of dither signals having successive conditions for successive samples of said digital signals, and an AND gate having a first input coupled for receiving said dither signals, having a second input coupled for receiving the least significant bit of said digital signals and having an output at which said bit signals are developed.

13. The apparatus of claim 5 wherein said combining means comprises delaying means for delaying said processed digital signals, and second combining means for combining said processed digital signals and said delayed processed digital signas to produce said digital ouput signals.

14. The apparatus of claim 13 wherein said second combining means includes a digital adder for adding said processed digital signals and said delayed processed digital signals to produce said digital output signals.

15. The apparatus of claim 5 wherein said processing means includes multiplexing means for sequentially producing respective groups of bits of said digital signals, and demultiplexing means for reforming said digital signals from said respective groups of bits thereof.

16. In digital signal processing apparatus including a source of digital samples having N bits, each of said samples having an N-M most significant bit portion and an M least significant bit portion, N and M being positive integers and M being less than N, wherein the M least significant bit portion of said digital samples may have a plurality of values corresponding to the digital values which may be represented by an M bit digital signal, truncating means for developing processed digital samples having N-M bits, comprising:

first means, coupled to said source, responsive to the M least significant bits of said digital samples having a value greater than a predetermined value for producing bit signals having one of first and second values, and responsive to the M least significant bits of said digital samples having a value not greater than said predetermined value for producing bit signals which alternate between said first and second values for successive ones of said digital samples; and second means, coupled to said source and to said first means, for combining said bit signals and the N-M most significant bits of said digital samples exclusive of the M least significant bits of said digital samples, to develop processed digital samples having N-M bits.

17. The apparatus of claim 16 wherein said first means comprises delaying means for delaying the most significant bit of the M least significant bits of said digital samples, and detecting means for producing said bit signals in response to coincidence and non-coincidence of the most significant bit of said M least significant bits and said delayed bit.

18. The apparatus of claim 17 wherein said detecting means includes an AND gate having first and second inputs for receiving the most significant bit of said M least significant bits and said delayed bit, respectively.

19. The apparatus of claim 17 wherein said first means further comprises delaying means for delaying said bit signals, and said detecting means produces said bit signals in response to coincidence and non-coincidence of the most significant bit of said M least significant bits, said delayed bit and said delayed bit signals.

20. The apparatus of claim 19 wherein said second means includes a digital adder for adding said bit signals and the bits of said digital samples other than the M least significant bits thereof.

21. The apparatus of claim 16 wherein said second means includes a digital adder for adding said bit signals and the bits of said digital samples other than the M least significant bits thereof.

22. The apparatus of claim 16 wherein said first means comprises a source of dither signals having alternating values for alternate ones of said digital samples, and an AND gate having a first input coupled for receiving said dither signals, having a second input coupled for receiving the most significant bit of the M least significant bits of said digital samples and having an output at which said bit signals are developed.

* * * * *